(12) United States Patent
Ishtiaq et al.

(10) Patent No.: US 7,089,174 B2
(45) Date of Patent: Aug. 8, 2006

(54) MODELLING DEVICE BEHAVIOUR USING A FIRST MODEL, A SECOND MODEL AND STORED VALID BEHAVIOUR

(75) Inventors: Syed Samin Ishtiaq, Cambridge (GB); Peter Neal, Cambridge (GB); John Mark Burton, Cambridge (GB)

(73) Assignee: ARM Limited, Cambridge (GB)

( * ) Notice: Subject to any disclaimer, the term of this patent is extended or adjusted under 35 U.S.C. 154(b) by 705 days.

(21) Appl. No.: 10/369,619

(22) Filed: Feb. 21, 2003

(65) Prior Publication Data

US 2004/0167766 A1    Aug. 26, 2004

(51) Int. Cl.
*G06F 9/45* (2006.01)
(52) U.S. Cl. .......................................... 703/22; 706/30
(58) Field of Classification Search ................. 703/22; 716/6; 706/25, 30
See application file for complete search history.

(56) References Cited

U.S. PATENT DOCUMENTS

| 5,345,179 | A | * | 9/1994 | Habashy et al. ............ 324/338 |
| 5,471,391 | A | * | 11/1995 | Gudat et al. ................... 701/50 |
| 5,579,031 | A | * | 11/1996 | Liang .......................... 345/604 |
| 6,697,087 | B1 | * | 2/2004 | Kelly .......................... 715/735 |
| 6,763,507 | B1 | * | 7/2004 | Mielke .......................... 716/6 |
| 6,771,809 | B1 | * | 8/2004 | Rubbert et al. ............. 382/154 |
| 6,941,287 | B1 | * | 9/2005 | Vaidyanathan et al. ....... 706/12 |

* cited by examiner

*Primary Examiner*—Albert W. Paladini
(74) *Attorney, Agent, or Firm*—Nixon & Vanderhye P.C.

(57) ABSTRACT

A first model (10), such as a architectural level model or an instruction set simulator model makes calls to a second model (12), such as a pipeline simulator for a data processing device returning cycle count or energy consumption values. The calls to the second model are relatively slow. The system stalls the returned behavioural characteristics from the second model (12) in a memo table (14) and when a sufficient number of these have been returned with sufficiently little variation between them, then they are marked as being valid for use in place of a call to the second model (12), thus speeding up modelling.

33 Claims, 4 Drawing Sheets

MODELLING DEVICE BEHAVIOUR USING A FIRST MODEL, A SECOND MODEL AND STORED VALID BEHAVIOUR

BACKGROUND OF THE INVENTION

1. Field of the Invention

This invention relates to the field of modelling the behaviour of devices. More particularly, this invention relates to modelling device behaviour using a first model, a second model and stored valid behaviour acting in combination.

2. Description of the Prior Art

There is an increasing need to provide for the modelling of devices. It is often the case that a device will be extensively modelled before any physical realisation of that device is built. This can allow the design of the device to be improved and also allow other devices which will co-operate with the device being modelled to be developed so as to interact with the device being modelled more appropriately. As an example, when developing a new data processing circuit it may be strongly desirable to be able to model characteristics of that data processing circuit before it is actually produced. As an example, modelling the power consumption or timing characteristics of the circuit can allow software that is being produced to execute upon that data processing circuit to be written to operate more quickly and consuming less energy before the physical circuit is available for test. There are also circumstances when modelling is desirable even when a physical device is available for test (e.g. modelling may be more convenient than configuring a physical device).

A problem is that modelling complex devices tends to be computationally intensive and can be disadvantageously slow. High level models such as architectural level models of a data processing circuit or instruction set simulator models of a data processing circuit may execute relatively rapidly, but do not readily yield sufficiently accurate detailed information such as processing cycle count and energy consumption given the complex behaviour of typical data processing circuits. Accordingly, it is known to utilise such high level models in combination with a further more detailed model, such as a processor pipeline model to yield cycle counts, in order to produce more accurate results. However, the lower level models tend to be much slower than the high level models and thus the need to repeatedly call the lower level model greatly slows modelling speed.

SUMMARY OF THE INVENTION

Viewed from one aspect the present invention provides a method of modelling behaviour of a device following an execution path between sequence points to determine a desired behavioural characteristic, said method comprising the steps of:

using a first model to determine from a starting state of said device defining a starting sequence point a next state of said device defining a next sequence point;

detecting if said first model has previously modelled said device performing a modelling step of moving between said starting sequence point and said next sequence point and stored as valid said desired behavioural characteristic associated with said modelling step;

if said desired behavioural characteristic associated with said modelling step is not stored as valid, then using a second model to model said device moving between said starting sequence point and said next sequence point to determine said desired behavioural characteristic; and if said desired behavioural characteristic associated with said modelling step is stored as valid, then using said previously determined stored behavioural characteristic without using said second model.

The present invention recognises that when modelling a device it is common for the same execution path to be followed a large number of times in the same circumstances, or in closely similar circumstances. Thus, for example, rather than calling the more detailed model to determine the required behavioural characteristic on every pass through that execution path, the present technique stores a previously determined value of the behavioural characteristic for that path as generated by the second model and uses this instead without the need to call the second model on every pass. The two models could also separately execute in parallel with the traces being communicated as required. Thus, a modelling process may start off relatively slowly as each execution path traversed will not have previously been encountered, but will then gradually speed up as more of the modelling steps have previously been modelled and valid results stored for them enabling a call to the slower second model to be omitted.

It is important that the stored values of the behavioural characteristics should be reasonably accurate so that the approximation of using them in place of an actual call to the second model is sufficiently valid. In order to improve the accuracy of the technique a stored behavioural characteristic will not be indicated as valid for use as a substitute to a call to the second model until the modelled execution path concerned has been modelled a plurality of times and respective determined values of the behavioural characteristic produced by the second model on each of these calls have been found to have a variation less than a predetermined level. Thus, the present technique will substitute a stored value for a call to the second model in these preferred embodiments only when the behavioural characteristic values that were being returned from the second model are found to have shown a sufficiently consistent behaviour for a simple substitution of a stored value to be sufficiently accurate (i.e. valid).

Whilst it will be appreciated that the device being modelled could take a wide variety of forms, the present technique is particularly well suited to modelling devices that are data processing devices such as microprocessor cores, DSPs, etc.

The behavioural characteristics being modelled could take a wide variety of forms, but in the context of data processing devices the present technique is particularly well suited to the modelling of processing cycle count or energy consumption.

It will be appreciated that the high level first model could take a wide variety of different forms, but the invention is particularly well suited to use when the first model is an architectural level model with the control flow points being control flow points within the architectural model or embodiments in which the first model is an instruction set model with the control flow points being branch points within the program code being run on the instruction set model.

As previously mentioned, determined behavioural characteristics calculated by the second model are examined to see if they are sufficiently consistent before they are deemed valid for use as a substitute for an actual call to the second model. The predetermined level of variation in order that a behavioural characteristic value may be treated as valid is preferably user adjustable such that any user can make their own decision regarding the trade off between the accuracy of the modelling being performed and the speed of the modelling being performed.

It will be appreciated that the starting sequence point and the next sequence point will each be characterised by an associated set of parameters which define the system state at those two points. Difference starting values of the set of parameters would result in different subsequent behaviour. These parameters may be used to index the behavioural characteristics determined by the second model and stored for possible later use as a substitute for a call to the second model. Preferred embodiments further realise that in many cases only a suitable subset of the parameters that define the system state at the sequence points need to be stored with the behavioural characteristics in order to achieve sufficient accuracy.

Preferred embodiments may also provide a coalescing function whereby units of previously identified stored valid behavioural characteristics and associated parameters can be joined together.

It will be appreciated that all modelling to some extent is an estimation of the true behaviour of a device, but the present technique extends this further in that the use of stored behavioural characteristics rather than calling the second model produces an estimation of a modelled behaviour which is in turn an estimation of the true behaviour of the device. Nevertheless, the accuracy of this technique can be sufficient for many purposes and the higher speed of operation is strongly advantageous.

Viewed from another aspect the present invention provides apparatus for modelling behaviour of a device following a execution path between sequence points to determine a desired behavioural characteristic, said apparatus comprising:

first model logic operable to determine from a starting state of said device defining a starting sequence point a next state of said device defining a next sequence point; and detection logic operable to detect if said first model logic has previously modelled said device performing a modelling step of moving between said starting sequence point and said next sequence point and stored as valid said desired behavioural characteristic associated with said modelling step; wherein if said desired behavioural characteristic associated with said modelling step is not stored as valid, then using second model logic to model said device moving between said starting sequence point and said next sequence point to determine said desired behavioural characteristic; and if said desired behavioural characteristic associated with said modelling step is stored as valid, then using said previously determined stored behavioural characteristic without using said second model logic.

Viewed from a further aspect the present invention provides a computer program product comprising a computer program for controlling a computer to model behaviour of a device following a execution path between sequence points to determine a desired behavioural characteristic, said computer program comprising:

first model code operable to determine from a starting state of said device defining a starting sequence point a next state of said device defining a next sequence point; and detection code operable to detect if said first model code has previously modelled said device performing a modelling step of moving between said starting sequence point and said next sequence point and stored as valid said desired behavioural characteristic associated with said modelling step; wherein if said desired behavioural characteristic associated with said modelling step is not stored as valid, then using second model code to model said device moving between said starting sequence point and said next sequence point to determine said desired behavioural characteristic; and if said desired behavioural characteristic associated with said modelling step is stored as valid, then using said previously determined stored behavioural characteristic without using said second model code.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
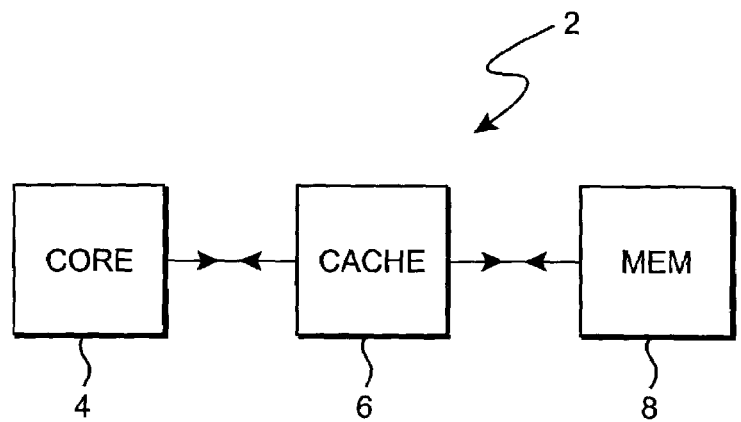
FIG. 1 schematically illustrates a data processing device which may be modelled.

FIG. 1 illustrates a data processing device 2 comprising a processor core 4, a cache memory 6 and a main memory 8. The processor core 4 will execute a sequence of program instructions to perform data processing operations. These program instructions will require data to be retrieved from the cache memory 6 and possibly the main memory 8 should a cache miss occur. The speed with which the processor core 4 executes the program instructions and the energy consumed by that execution can be highly critical design parameters for the performance of the data processing system 2 and the software in the form of the program code being executed. Accordingly, it is strongly desirable to be able to model this type of behaviour, for example, before physical devices are actually available.

Figure 2:
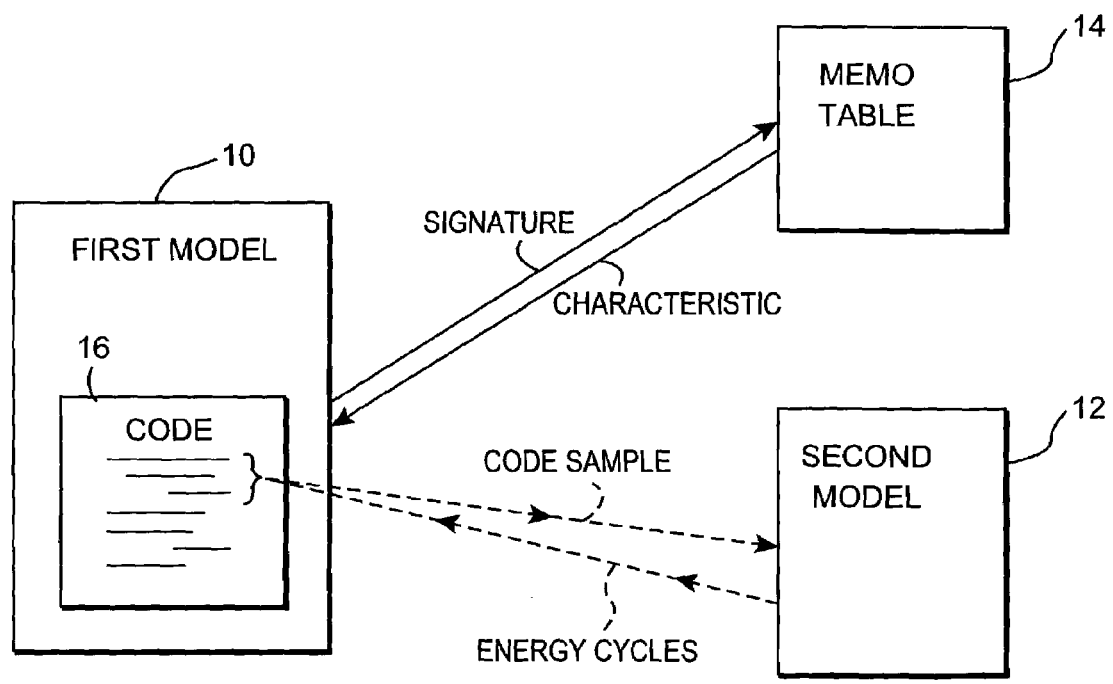
FIG. 2 schematically illustrates a first model and a second model used in modelling the data processing device of FIG. 1.

FIG. 2 illustrates a first model 10, which may be an architectural level model or an instruction set simulator model. Within an architectural level model the sequence points between which modelling steps are taken are control flow points within the architectural level model. When the first model is an instruction set simulator model, then the control sequence points between which modelling steps are taken can be control flow points in the form of branch points within the program code.

FIG. 2 also shows a second model 12 which is operable to produce values representing detailed behavioural characteristics of the data processing device 2 at the cost of being relatively slow to execute. The behavioural characteristics concerned can include the processing cycle count needed to execute between two sequence points, the energy consumed in executing between two sequence points or other characteristics, such as bus usage etc. A memo table 14 is provided which stores previously calculated behavioural characteristics generated by the second model 12 in association with tags which identify the starting sequence point which gave rise to those behavioural characteristics. When the stored behavioural characteristics for a particular starting point have displayed a user adjustable degree of consistency upon multiple passes through the execution path concerned, then the stored behavioural characteristics within the memo table 14 will be marked as valid and will be used by the first model 10 instead of a call to the second model 12.

In operation, the first model 10 traverses an execution path defined by a code listing 16. This code listing 16 is broken down into code samples extending between control flow points within the code listing 16. If the first model 10 is an instruction set simulator, then the control flow points may be branch points within the program code. If the first model 10 is an architectural model, then the control flow points may be "if" statements within the architectural level model. The first model 10 follows an execution path through the code listing 16 and identifies code samples for which it wishes to determine a desired behaviour characteristic, such as cycle count. The first model 10 then checks within the memo table 14 to determine if a valid behavioural characteristic associated with that code sample has already been determined. If a valid behavioural characteristic has already been determined, then this characteristic is returned from the memo table 14 and no call to the second model will be made. However, if a valid behavioural characteristic has not yet been stored within the memo table 14, then a call is made to the second model 12 where the behavioural characteristic is calculated and returned to the first model 10. The stored behavioural characteristics within the memo table 14 are indexed under a signature or tag value which is a combination of the state parameters, or at least a subset of the state parameters, which define the state of the data processing device 2 at the starting sequence point for the modelling step. The parameters used as this signature/tag need not be a full state definition of the data processing device, but will typically include parameters defining conditions such as the position within the execution path, whether or not required instructions or data are stored within the cache memory 6 or the main memory 8, condition code flag pass or fail parameters, parameters indicating the instruction being executed etc. It will be appreciated that the larger the number of parameters used to define the stored behavioural characteristics, then the more fine grained may be made the stored behaviour at the cost of increased storage requirements and slower operation, but with an increase in accuracy.

Figure 3:
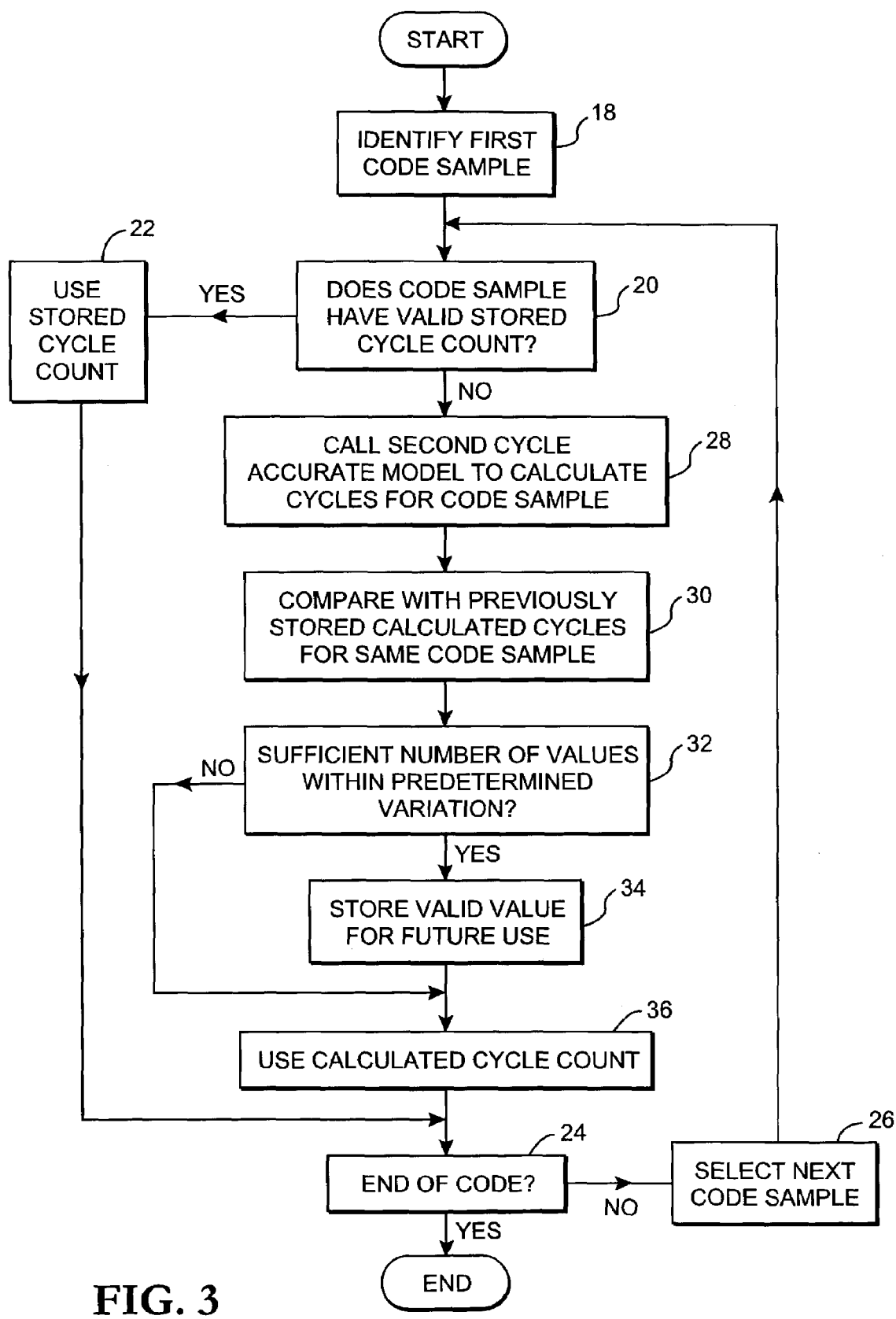
FIG. 3 is a flow diagram schematically illustrating the execution of the first model with selective use of stored previously calculated behavioural characteristics from the second model.

FIG. 3 is a flow diagram illustrating the operation of the first simulator 10. At step 18 the first model 10 identifies the first code sample. At step 20 a determination is made as to whether or not there is a validly stored cycle count value (this example relates to cycle count) within a memo table 14. If there is an already stored valid value, then processing proceeds to step 22 at which this stored valid cycle count value is used and processing proceeds to step 24 where a determination is made as to whether or not the end of the execution path being simulated has been reached. If the end has not been reached, then processing proceeds to step 26 at which the next code sample is selected and processing returned to step 20.

If the determination at step 20 was that a valid stored cycle count value was not present, then processing proceeds to step 28 at which a call (relatively slow) is made to the second model 12 for a cycle calculation to be made of the code sample concerned. The second model 12 will be passed details of the code sample to be modelled and will return a cycle count value.

At step 30 the calculated cycle count value is compared with previously calculated and stored cycle count values for the same code sample produced on previous passes through that code sample. At step 32 a determination is made amongst that set of previously calculated cycle count values for the code sample concerned as to whether or not there is a sufficient number of them with sufficiently little variation for a valid stored value to be noted for future use in place of an actual call to the second model 12. If such a validity threshold has been reached, then processing proceeds to step 34 at which a stored value is marked as valid for future use in place of a call to the second model 12. If this validity threshold has not yet been reached, then step 34 is bypassed. Step 36 uses the calculated cycle count from step 28. Processing then proceeds to step 24.

Figure 4:
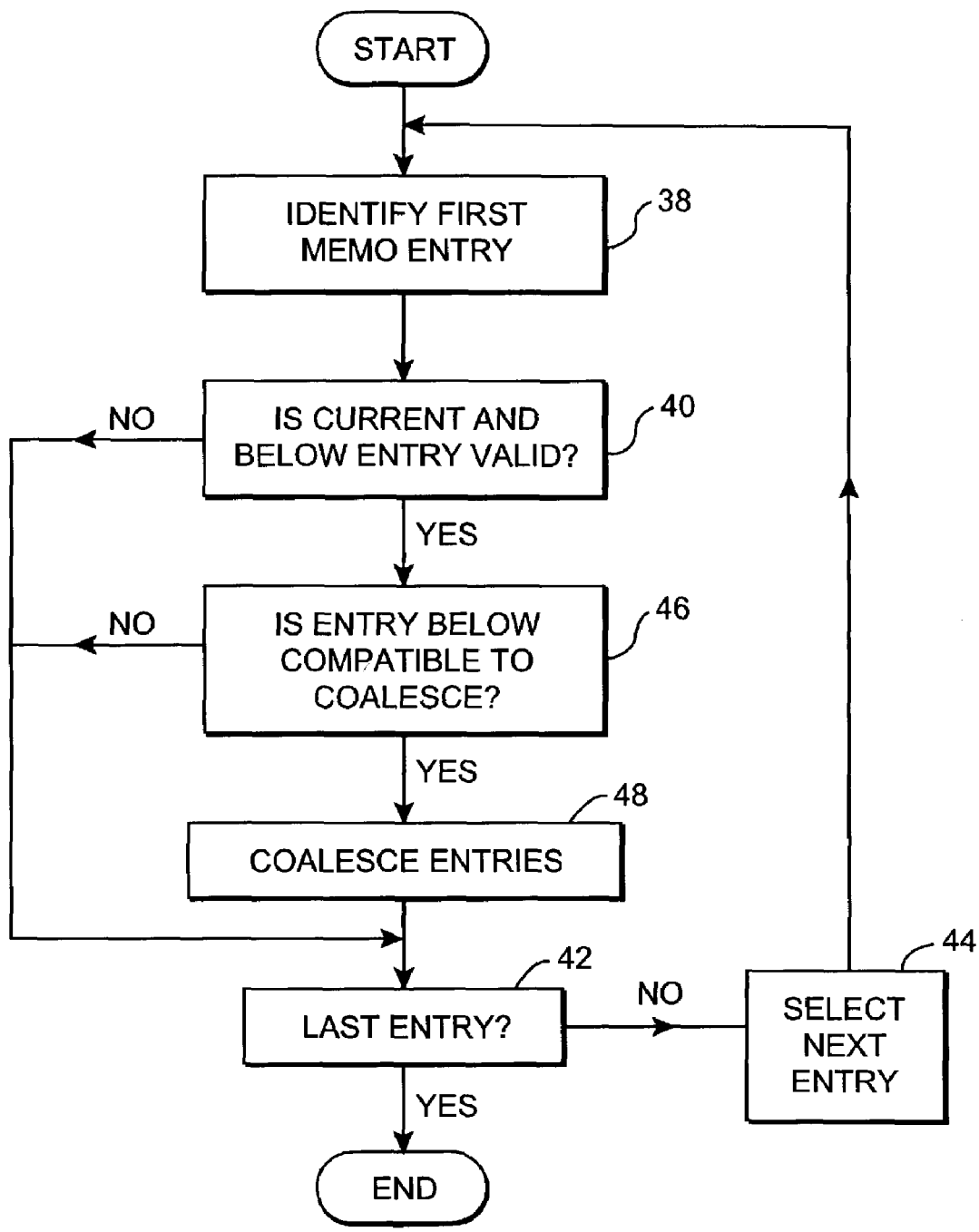
FIG. 4 is a flow diagram schematically illustrating a coalescing process performed upon stored behavioural characteristics in a memo table from the second model.

FIG. 4 is a flow diagram schematically illustrating a coalescing process which is continuously performed on the memo table 14 (possibly as a low priority thread). The function of this coalescing process is to identify adjacent code samples that have shown sufficiently consistent results to be represented by valid stored values and have compatible entry requirements such that they may effectively be combined and treated as a single code sample during subsequent modelling. At step 38, the process identifies the first memo entry within the memo table 15. At step 40 a determination is made as to whether or not the following entry in the execution path is also valid. If the following entry is not also valid, then processing proceeds to step 42 where a determination is made as to whether or not the last entry in the memo table has been reached. If the last entry has not been reached, then processing proceeds to step 44 to select the next entry and is then returned to step 38. If the last entry has been reached, then the coalescing process for this cycle terminates.

If the determination at step 40 is that the current entry and the entry below are both valid, then processing proceeds to step 46 where a determination is made as to whether or not these two entries are compatible for coalescing. This check examines items such as the parameters associated with the starting sequence points for the two entries to ensure that they are consistent, i.e. the starting parameters which lead to execution of a code sample associated with the first memo entry inevitably (or at least highly probably) also lead to execution of the code sample associated with the second memo entry. If these lower entries are compatible, then step 48 combines/coalesces the entries before proceeding to step 42. If the low entries are not compatible, then step 48 is bypassed.

Figure 5:
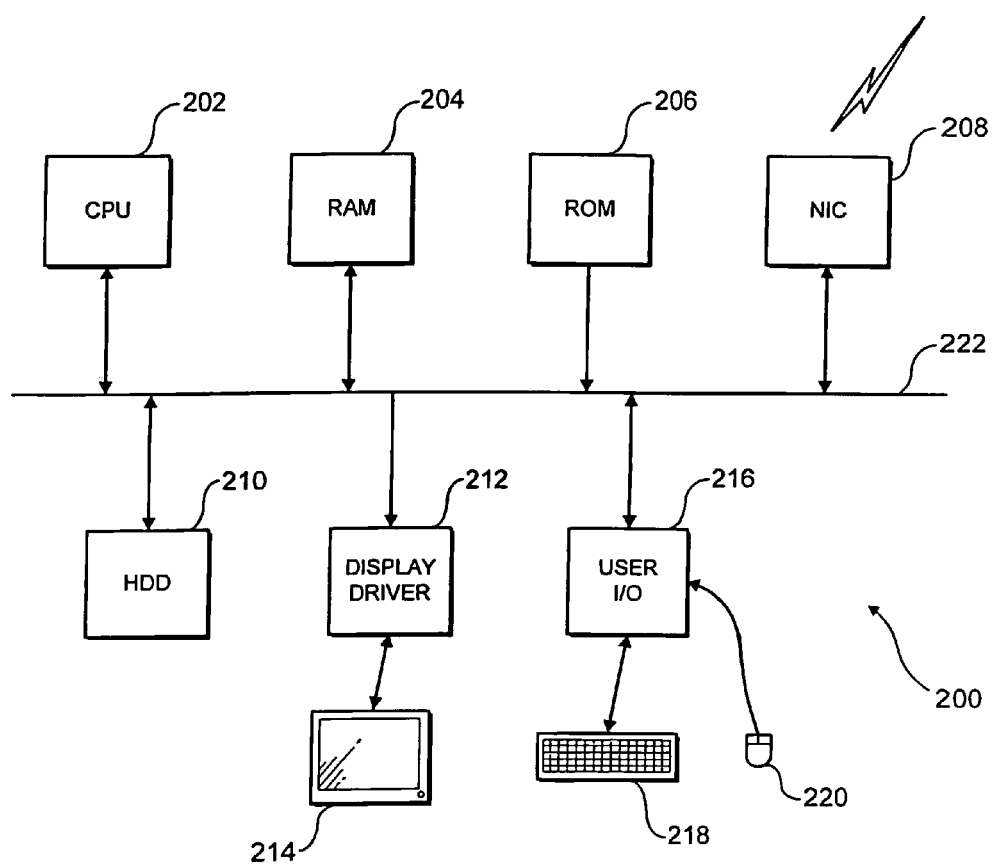
FIG. 5 is a diagram schematically illustrating the architecture of a general purpose computer that would be used to provide the above operation.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of modelling behaviour of a device following an execution path between sequence points to determine a desired behavioural characteristic, said method comprising the steps of:

using a first model to determine from a starting state of said device defining a starting sequence point a next state of said device defining a next sequence point;

detecting if said first model has previously modelled said device performing a modelling step of moving between said starting sequence point and said next sequence point and stored as valid said desired behavioural characteristic associated with said modelling step;

if said desired behavioural characteristic associated with said modelling step is not stored as valid, then using a second model to model said device moving between said starting sequence point and said next sequence point to determine said desired behavioural characteristic; and if said desired behavioural characteristic associated with said modelling step is stored as valid, then using said previously determined stored behavioural characteristic without using said second model.

2. A method as claimed in claim 1, wherein said desired behavioural characteristic is stored as valid when said second model has modelled said device moving between said starting sequence point and said next sequence point a plurality times and determined that respective determined values of said desired behavioural characteristic have a variation that is less than a predetermined level.

3. A method as claimed in claim 1, wherein said device is a data processing device.

4. A method as claimed in claim 3, wherein said desired behavioural characteristic is one or more of:

a processing cycle count associated with said modelling step; and an energy consumption value associated with said modelling step.

5. A method as claimed in claim 3, wherein said starting sequence point and said next sequence point are control flow points.

6. A method as claimed in claim 5, wherein said first model is an architectural level model of said data processing device and said control flow points are control flow points within said architectural level model.

7. A method as claimed in claim 5, wherein said first model is an instruction set model of said data processing device and said control flow points are branch points within program code.

8. A method as claimed in claim 2, wherein said predetermined level is user adjustable such that a larger predetermined level produces faster modelling with less accuracy and a smaller predetermined level produces slower modelling with greater accuracy.

9. A method as claimed in claim 1, wherein stored behavioural characteristics are associated with one or more parameters of said starting state of said starting sequence point giving rise to said stored behavioural characteristic upon moving to said next sequence point.

10. A method as claimed in claim 9, wherein said one or more parameters are a subset of said starting state.

11. A method as claimed in claim 10, wherein said stored behavioural characteristics are an estimation of behavioural characteristics that would be produced by said second model.

12. Apparatus for modelling behaviour of a device following a execution path between sequence points to determine a desired behavioural characteristic, said apparatus comprising:

first model logic operable to determine from a starting state of said device defining a starting sequence point a next state of said device defining a next sequence point; and detection logic operable to detect if said first model logic has previously modelled said device performing a modelling step of moving between said starting sequence point and said next sequence point and stored as valid said desired behavioural characteristic associated with said modelling step; wherein if said desired behavioural characteristic associated with said modelling step is not stored as valid, then using second model logic to model said device moving between said starting sequence point and said next sequence point to determine said desired behavioural characteristic; and if said desired behavioural characteristic associated with said modelling step is stored as valid, then using said previously determined stored behavioural characteristic without using said second model logic.

13. Apparatus as claimed in claim 12, wherein said desired behavioural characteristic is stored as valid when said second model logic has modelled said device moving between said starting sequence point and said next sequence point a plurality times and determined that respective determined values of said desired behavioural characteristic have a variation that is less than a predetermined level.

14. Apparatus as claimed in claim 12, wherein said device is a data processing device.

15. Apparatus as claimed in claim 14, wherein said desired behavioural characteristic is one or more of:

a processing cycle count associated with said modelling step; and an energy consumption value associated with said modelling step.

16. Apparatus as claimed in claim 14, wherein said starting sequence point and said next sequence point are control flow points.

17. Apparatus as claimed in claim 16, wherein said first model logic provides an architectural level model of said data processing device and said control flow points are control flow points within said architectural level model.

18. Apparatus as claimed in claim 16, wherein said first model logic provides an instruction set model of said data processing device and said control flow points are branch points within program code.

19. Apparatus as claimed in claim 13, wherein said predetermined level is user adjustable such that a larger predetermined level produces faster modelling with less accuracy and a smaller predetermined level produces slower modelling with greater accuracy.

20. Apparatus as claimed in claim 12, wherein stored behavioural characteristics are associated with one or more parameters of said starting state of said starting sequence point giving rise to said stored behavioural characteristic upon moving to said next sequence point.

21. Apparatus as claimed in claim 20, wherein said one or more parameters are a subset of said starting state.

22. Apparatus as claimed in claim 21, wherein said stored behavioural characteristics are an estimation of behavioural characteristics that would be produced by said second model.

23. A computer program product comprising a computer program for controlling a computer to model behaviour of a device following a execution path between sequence points to determine a desired behavioural characteristic, said computer program comprising:
  first model code operable to determine from a starting state of said device defining a starting sequence point a next state of said device defining a next sequence point; and
  detection code operable to detect if said first model code has previously modelled said device performing a modelling step of moving between said starting sequence point and said next sequence point and stored as valid said desired behavioural characteristic associated with said modelling step; wherein
  if said desired behavioural characteristic associated with said modelling step is not stored as valid, then using second model code to model said device moving between said starting sequence point and said next sequence point to determine said desired behavioural characteristic; and
  if said desired behavioural characteristic associated with said modelling step is stored as valid, then using said previously determined stored behavioural characteristic without using said second model code.

24. A computer program product as claimed in claim 23, wherein said desired behavioural characteristic is stored as valid when said second model code has modelled said device moving between said starting sequence point and said next sequence point a plurality times and determined that respective determined values of said desired behavioural characteristic have a variation that is less than a predetermined level.

25. A computer program product as claimed in claim 23, wherein said device is a data processing device.

26. A computer program product as claimed in claim 25, wherein said desired behavioural characteristic is one or more of:
  a processing cycle count associated with said modelling step; and
  an energy consumption value associated with said modelling step.

27. A computer program product as claimed in claim 25, wherein said starting sequence point and said next sequence point are control flow points.

28. A computer program product as claimed in claim 27, wherein said first model code provides an architectural level model of said data processing device and said control flow points are control flow points within said architectural level model.

29. A computer program product as claimed in claim 27, wherein said first model code provides an instruction set model of said data processing device and said control flow points are branch points within program code.

30. A computer program product as claimed in claim 24, wherein said predetermined level is user adjustable such that a larger predetermined level produces faster modelling with less accuracy and a smaller predetermined level produces slower modelling with greater accuracy.

31. A computer program product as claimed in claim 23, wherein stored behavioural characteristics are associated with one or more parameters of said starting state of said starting sequence point giving rise to said stored behavioural characteristic upon moving to said next sequence point.

32. A computer program product as claimed in claim 31, wherein said one or more parameters are a subset of said starting state.

33. A computer program product as claimed in claim 32, wherein said stored behavioural characteristics are an estimation of behavioural characteristics that would be produced by said second model.

* * * * *